United States Patent
McCaffrey

(10) Patent No.: US 10,808,562 B2
(45) Date of Patent: Oct. 20, 2020

(54) SEAL ASSEMBLY FOR TURBINE ENGINE COMPONENT

(71) Applicant: United Technologies Corporation, Farmington, CT (US)

(72) Inventor: Michael G. McCaffrey, Windsor, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 66 days.

(21) Appl. No.: 16/254,694

(22) Filed: Jan. 23, 2019

(65) Prior Publication Data

US 2020/0025007 A1    Jan. 23, 2020

Related U.S. Application Data

(63) Continuation of application No. 14/848,419, filed on Sep. 9, 2015, now Pat. No. 10,233,763.

(51) Int. Cl.
*F02C 7/28* (2006.01)
*F01D 11/00* (2006.01)
(Continued)

(52) U.S. Cl.
CPC .............. *F01D 11/003* (2013.01); *F01D 5/12* (2013.01); *F01D 9/02* (2013.01); *F01D 11/00* (2013.01); *F01D 11/08* (2013.01); *F01D 11/14* (2013.01); *F01D 11/20* (2013.01); *F02C 7/28* (2013.01); *F16J 15/028* (2013.01); *F16J 15/061* (2013.01); *F23R 3/002* (2013.01); *F01D 11/005* (2013.01);
(Continued)

(58) Field of Classification Search
CPC ........ F02C 7/28; F01D 11/005; F01D 11/025; F01D 11/08
See application file for complete search history.

(56) References Cited

U.S. PATENT DOCUMENTS

| | | |
|---|---|---|
| 3,689,177 A | 9/1972 | Klassen |
| 3,703,206 A | 11/1972 | Barnard |
| | (Continued) | |

FOREIGN PATENT DOCUMENTS

| | | |
|---|---|---|
| DE | 554858 | 7/1932 |
| EP | 1248023 | 10/2002 |
| | (Continued) | |

OTHER PUBLICATIONS

European Search Report for European Patent Application No. 16188183 completed Jan. 23, 2017.

*Primary Examiner* — Gerald L Sung
(74) *Attorney, Agent, or Firm* — Carlson, Gaskey & Olds, P.C.

(57) ABSTRACT

A seal assembly for a gas turbine engine according to an example of the present disclosure includes, among other things, a housing mountable to an engine static structure, a seal carrier secured to the housing and configured to be selectively biased from the housing, and a wedge seal secured to the seal carrier. The wedge seal abuts against sealing surfaces of adjacent blade outer air seals in response to movement of the seal carrier relative to the housing. The wedge seal is separate and distinct from the seal carrier. A method of sealing between adjacent components of a gas turbine engine is also disclosed.

20 Claims, 5 Drawing Sheets

(51) Int. Cl.
  *F23R 3/00* (2006.01)
  *F01D 9/02* (2006.01)
  *F01D 5/12* (2006.01)
  *F01D 11/08* (2006.01)
  *F01D 11/14* (2006.01)
  *F01D 11/20* (2006.01)
  *F16J 15/02* (2006.01)
  *F16J 15/06* (2006.01)

(52) U.S. Cl.
  CPC ...... *F05D 2220/32* (2013.01); *F05D 2230/60* (2013.01); *F05D 2240/35* (2013.01); *F05D 2260/52* (2013.01); *Y02T 50/60* (2013.01)

(56) References Cited

U.S. PATENT DOCUMENTS

| | | | |
|---|---|---|---|
| 5,156,528 A | 10/1992 | Bobo | |
| 5,306,021 A | 4/1994 | Morvant | |
| 6,305,265 B1 | 10/2001 | Bingham | |
| 6,431,825 B1 | 8/2002 | McLean | |
| 7,163,206 B2 | 1/2007 | Cross et al. | |
| 7,527,472 B2 | 5/2009 | Allen | |
| 2004/0150164 A1 | 8/2004 | Morgan | |
| 2004/0219014 A1 | 11/2004 | Synnott | |
| 2005/0082768 A1 | 4/2005 | Iguchi | |
| 2006/0038358 A1 | 2/2006 | James | |
| 2010/0092281 A1* | 4/2010 | Habarou | F01D 11/08 415/200 |
| 2012/0195743 A1 | 8/2012 | Walunj et al. | |
| 2012/0263576 A1* | 10/2012 | Lacy | F01D 25/12 415/115 |
| 2012/0285676 A1 | 11/2012 | Shaw | |
| 2013/0264779 A1 | 10/2013 | Hafner | |
| 2014/0023480 A1 | 1/2014 | McCaffrey | |
| 2014/0341728 A1 | 11/2014 | Cloarec | |
| 2015/0226132 A1 | 8/2015 | Roy Thill et al. | |
| 2016/0032747 A1 | 2/2016 | Bez | |
| 2016/0084101 A1 | 3/2016 | McCaffrey | |
| 2016/0290506 A1 | 10/2016 | Urac | |

FOREIGN PATENT DOCUMENTS

| | | |
|---|---|---|
| WO | 2015031763 | 3/2015 |
| WO | 2015061108 | 4/2015 |

\* cited by examiner

SEAL ASSEMBLY FOR TURBINE ENGINE COMPONENT

CROSS-REFERENCE TO RELATED APPLICATIONS

This application is a continuation of U.S. application Ser. No. 14/848,419, filed Sep. 9, 2015.

BACKGROUND

This disclosure relates to sealing for adjacent components of a gas turbine engine.

Gas turbine engines can include a fan for propulsion air and to cool components. The fan also delivers air into a core engine where it is compressed. The compressed air is then delivered into a combustion section, where it is mixed with fuel and ignited. The combustion gas expands downstream over and drives turbine blades. Static vanes and blade outer air seals (BOAS) are positioned adjacent to the turbine blades to control the flow of the products of combustion. Mate faces of adjacent vanes, blades and/or BOAS are arranged to define one or more gaps. The blades, vanes and BOAS are subject to extreme heat, and thus sealing schemes are utilized adjacent to the gaps.

SUMMARY

A seal assembly for a gas turbine engine according to an example of the present disclosure includes a housing, a seal carrier secured to the housing and configured to be selectively biased from the housing, and a wedge seal secured to the seal carrier and configured to abut against at least two sealing surfaces.

In a further embodiment of any of the forgoing embodiments, the seal carrier defines a spring cavity configured to receive a spring. The spring is configured to bias the seal carrier away from the housing.

In a further embodiment of any of the forgoing embodiments, the seal carrier defines a channel dimensioned to receive a portion of the wedge seal.

In a further embodiment of any of the forgoing embodiments, the seal carrier defines one or more retention members extending inwardly from walls of the channel to limit relative movement of the wedge seal in the channel.

In a further embodiment of any of the forgoing embodiments, the wedge seal defines a first engagement surface and a second engagement surface joined at an apex.

In a further embodiment of any of the forgoing embodiments, the wedge seal is configured to span across a gap defined by mate faces of adjacent engine components.

A further embodiment of any of the foregoing embodiments includes an insulation member arranged between the seal and the housing.

In a further embodiment of any of the forgoing embodiments, the insulation member is a thermal barrier coating deposited on surfaces of the seal.

A gas turbine engine according to an example of the present disclosure includes a section defining a core flow path along an engine axis, and at least one set of components arranged about the engine axis to define a core flow path. At least one set includes a first component defining a first sealing surface adjacent to a first mate face, and a second component defining a second sealing surface adjacent to a second mate face. The first and second mate faces are spaced apart to define a gap. A seal assembly includes a housing, a seal carrier secured to the housing and configured to be selectively biased from the housing, and a wedge seal secured to the seal carrier and configured to abut against at least one of the first and second sealing surfaces. The wedge seal is configured to self-center in response to movement of the seal carrier relative to the housing.

In a further embodiment of any of the forgoing embodiments, the wedge seal defines a first engagement surface and a second engagement surface joined at an apex. The first engagement surface is configured to abut against the first sealing surface, and the second engagement surface is configured to abut against the second sealing surface.

In a further embodiment of any of the forgoing embodiments, the apex is positioned in the gap, and the first and second sealing surfaces slope towards the corresponding first and second mate faces.

In a further embodiment of any of the forgoing embodiments, the seal carrier defines a channel configured to receive the wedge seal, and at least two retention members extend inwardly from the channel to limit radial movement of the wedge seal relative to the channel.

In a further embodiment of any of the forgoing embodiments, the first component is mounted to a first support structure. The second component is mounted to a second, different support structure moveable relative to the first support structure. The housing is coupled to at least one of the first and second support structures.

In a further embodiment of any of the forgoing embodiments, the housing includes a support member selectively received in a slot defined by the first support structure.

In a further embodiment of any of the forgoing embodiments, the seal assembly includes a spring configured to bias the seal carrier away from the housing in response to movement of the first component relative to the first support structure.

In a further embodiment of any of the forgoing embodiments, the seal carrier is moveable relative to the housing in response to movement of at least one of the first and second components in a circumferential direction relative to the engine axis.

In a further embodiment of any of the forgoing embodiments, each of the first and second components is one of an airfoil, a blade outer air seal (BOAS), and a combustor panel.

A method of sealing between adjacent components of a gas turbine engine according to an example of the present disclosure includes arranging mate faces of adjacent components to define a gap, and positioning a seal assembly adjacent to the gap. The seal assembly including a housing and a wedge seal abutting sealing surfaces of the adjacent components. The method includes moving the wedge seal relative to the housing in response to movement of one of the adjacent components relative to another one of the adjacent components.

In a further embodiment of any of the forgoing embodiments, the step of moving includes pivoting the wedge seal relative to the housing.

In a further embodiment of any of the forgoing embodiments, the wedge seal defines engagement surfaces joined at an apex. The engagement surfaces are configured to abut against the sealing surfaces, and the apex is positioned in the gap and is spaced apart from the mate faces.

Although the different examples have the specific components shown in the illustrations, embodiments of this disclosure are not limited to those particular combinations. It is possible to use some of the components or features from one of the examples in combination with features or components from another one of the examples.

The various features and advantages of this invention will become apparent to those skilled in the art from the following detailed description of an embodiment. The drawings that accompany the detailed description can be briefly described as follows.

DETAILED DESCRIPTION

Figure 1:
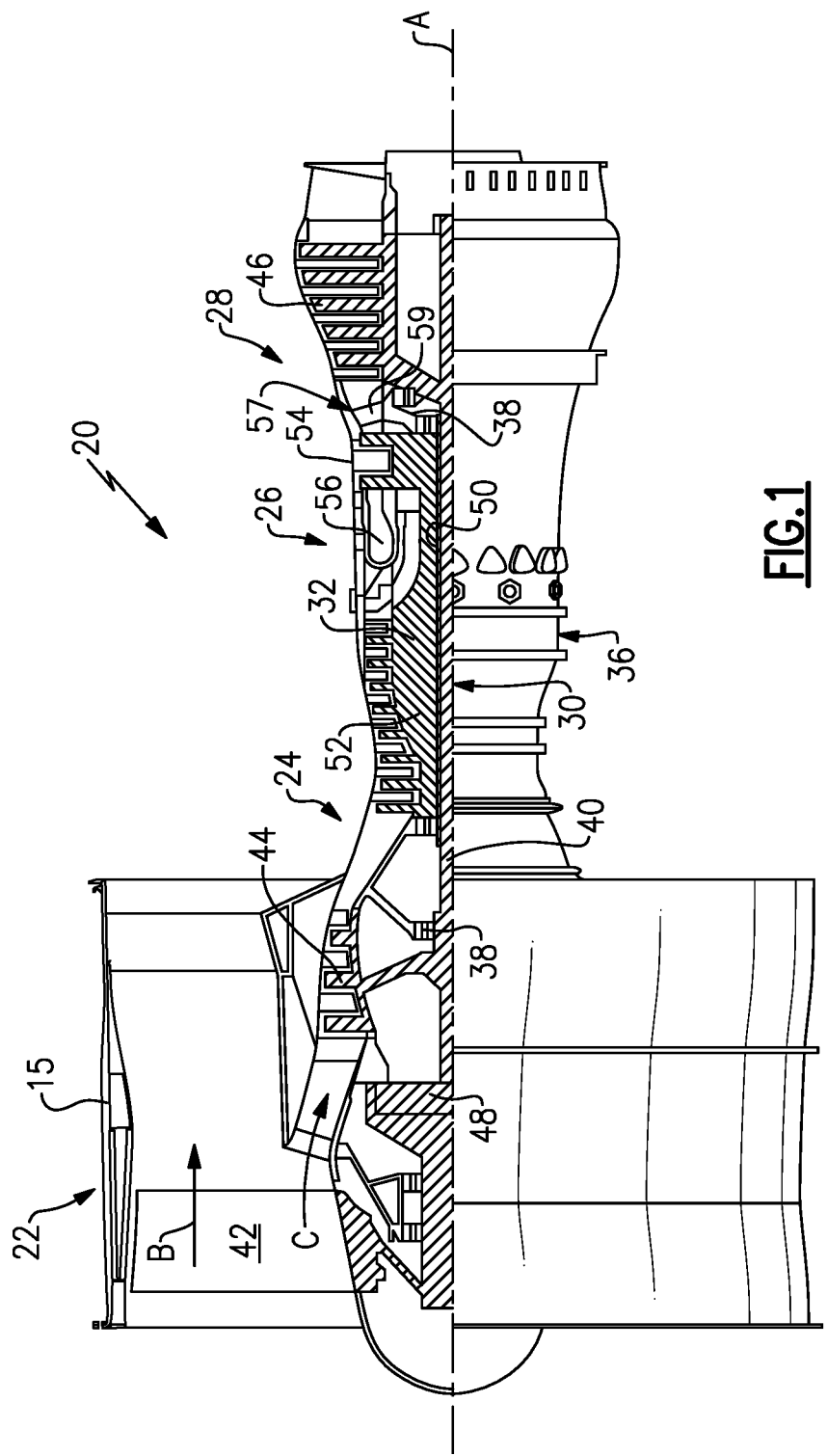
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The concepts described herein are not limited to use with turbofans and may be applied to other types of turbine engines, such as three-spool architectures. Alternative engines might also include an augmentor section (not shown) among other systems or features, or, may not include the fan section 22, such as in industrial gas turbine engines.

The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, the examples herein are not limited to use with two-spool turbofans and may be applied to other types of turbomachinery, including direct drive engine architectures, three-spool engine architectures, and ground-based turbines.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a second (or low) pressure turbine 46. The inner shaft 40 is connected to the fan 42 through a speed change mechanism, which in exemplary gas turbine engine 20 is illustrated as a geared architecture 48, to drive the fan 42 at a lower speed than the low speed spool 30.

The high speed spool 32 includes an outer shaft 50 that interconnects a second (or high) pressure compressor 52 and a first (or high) pressure turbine 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports the bearing systems 38 in the turbine section 28. The inner shaft 40 and the outer shaft 50 are concentric and rotate via bearing systems 38 about the engine central longitudinal axis A, which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines, including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second.

Figure 2:
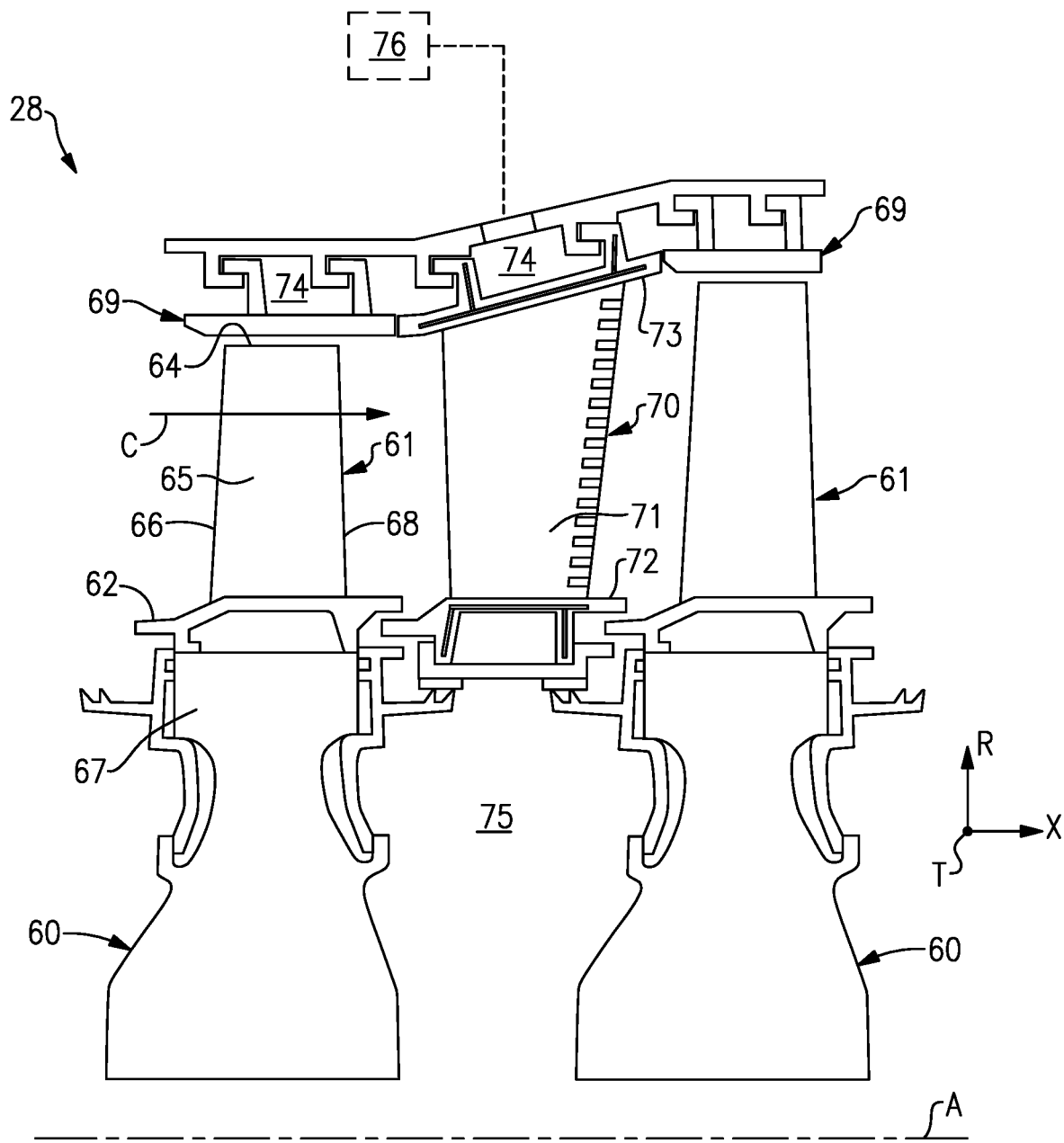
FIG. 2 schematically shows an airfoil arrangement for a turbine section.

FIG. 2 shows selected portions of the turbine section 28 including a rotor 60 carrying one or more airfoils 61 for rotation about the central axis A. In this disclosure, like reference numerals designate like elements where appropriate and reference numerals with the addition of one-hundred or multiples thereof designate modified elements that are understood to incorporate the same features and benefits of the corresponding original elements. Each airfoil 61 includes a platform 62 and an airfoil section 65 extending in a radial direction R from the platform 62 to a tip 64. The airfoil section 65 generally extends in a chordwise direction X between a leading edge 66 and a trailing edge 68. A root section 67 of the airfoil 61 is mounted to the rotor 60, for example. In alternative examples, the airfoil 61 is integrally formed with the rotor 60, which is sometimes referred to as an integrally bladed rotor (IBR). A blade outer air seal (BOAS) 69 is spaced radially outward from the tip 64 of the airfoil section 65. A vane 70 is positioned along the engine axis A and adjacent to the airfoil 61. The vane 70 includes an airfoil section 71 extending between an inner platform 72 and an outer platform 73 to define a portion of the core flow path C. The turbine section 28 includes multiple airfoils 61, vanes 70, and BOAS 69 arranged circumferentially about the engine axis A.

The outer platform 73 of vane 70 and the BOAS 69 can define one or more outer cooling cavities 74. The platform 62 of airfoil 61 and the inner platform 72 of vane 70 can define one or more inner cooling cavities 75. The cooling cavities 74, 75 are configured to receive cooling flow from one or more cooling sources 76 to cool portions of the airfoil 61, BOAS 69 and/or vane 70. Cooling sources 76 can include bleed air from an upstream stage of the compressor section 24 (shown in FIG. 1), bypass air, or a secondary cooling system aboard the aircraft, for example. Each of the cooling cavities 74, 75 can extend in a thickness direction T between adjacent airfoils 61, BOAS 69 and/or vanes 70, for example.

Figure 3A:
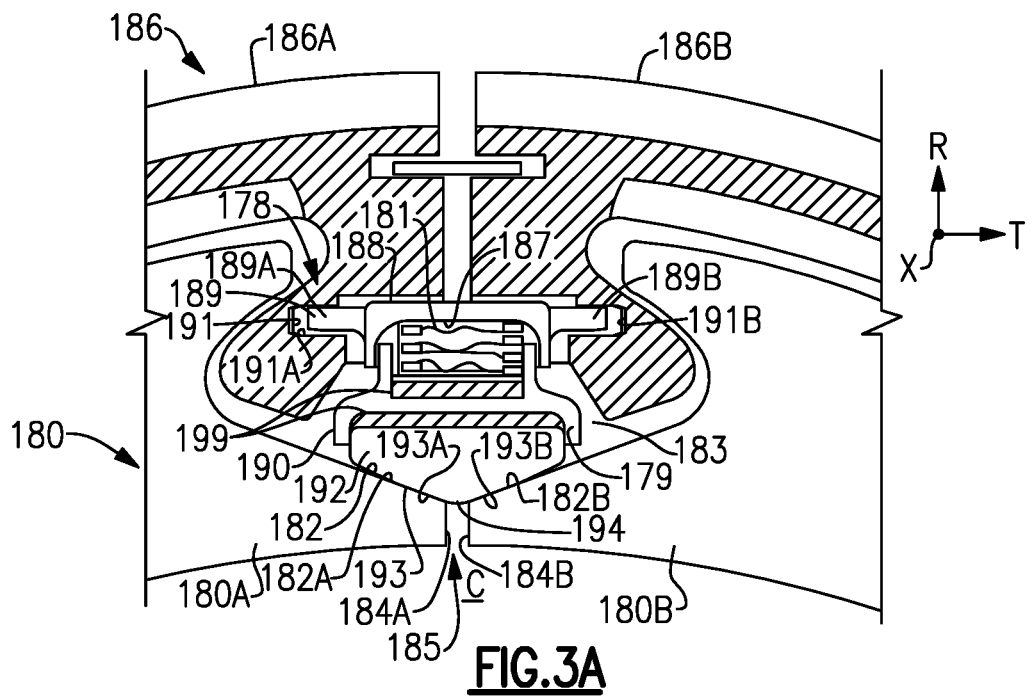
FIG. 3A illustrates a cross-sectional view of a sealing arrangement in a first position.
Figure 3B:
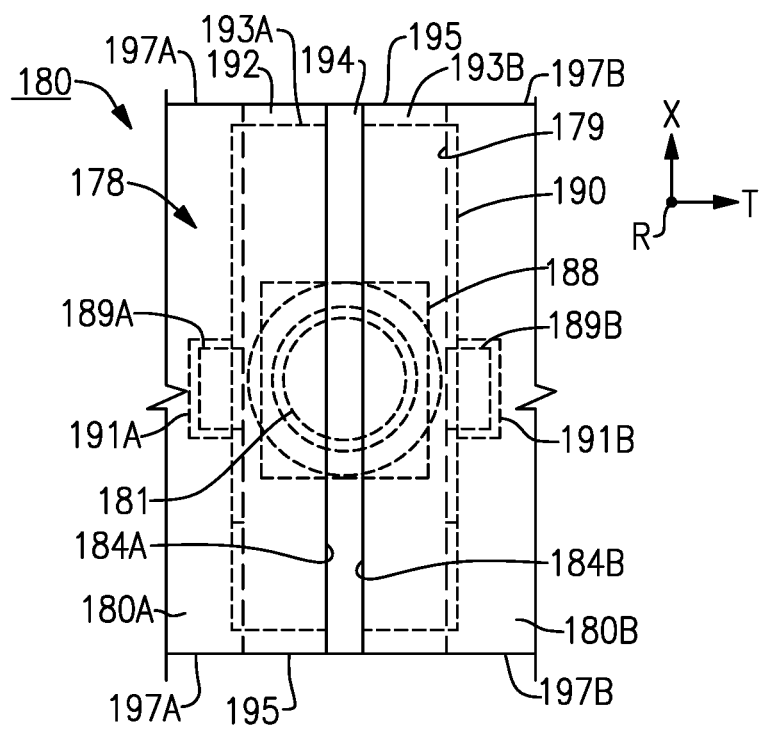
FIG. 3B illustrates a bottom view of selected portions of the sealing arrangement of FIG. 3A.

FIGS. 3A-3B (installed position) and 4 (uninstalled position) illustrate an exemplary cartridge or seal assembly 178 for sealing at least two distinct sealing surfaces 189 of one or more sets 180 of adjacent components 180A, 180B. The components 180A, 180B can be arranged about the engine axis A (FIG. 1) to define portions of the core flow path C. Although the components 180A, 180B discussed herein primarily refer to adjacent BOAS, such as BOAS 69, the teachings herein can also be utilized for other components at various radial, circumferential and/or axial positions or for another portion of the engine 20, such as airfoils 61, vanes 70, an upstream stage of the compressor section 24, or combustor panels located in the combustor section 26 and defining portions of a combustion chamber, exhaust nozzles, or augmentors, for example.

The first component 180A defines a first sealing surface 182A adjacent to, and sloping towards, a first mate face 184A. The second component 180B defines a second sealing surface 182B adjacent to, and sloping towards, a second mate face 184B. The first and second mate faces 184A, 184B are spaced apart to define a gap 185. In the illustrated example, the gap 185 extends a distance in the radial R and circumferential T directions, and the axial direction X which can be parallel or substantially parallel to the engine axis A. A distance of the gap 185 may change during various operating conditions of the engine 20, and may be reduced such that the mate faces 184A, 184B abut against each other.

One or more of the components 180A, 180B are mounted or are otherwise coupled to at least one support structure 186. In the illustrated example, support structure 186 includes a first support structure 186A and a second, different support structure 186B. The first component 180A is mounted to the first support structure 186A, and the second component 180B is mounted to the second support structure 186B. In some examples, the components 180 and support structure 186 define a portion of an active clearance control (ACC) system such that adjacent components 180A, 180B and/or support structures 186A, 186B are moveable relative to each other during changes in power or operating conditions of the engine 20. Movement may occur during thermal expansion and/or contraction of the components and/or by mechanical means such as one or more actuation devices. ACC systems are generally operable to vary clearances between adjacent BOAS and airfoils such as during hot start, take-off and cruise conditions, for example, to improve efficiency of the engine as is known.

The seal assembly 178 includes a seal carrier secured to a housing 188, and a seal 192 secured to the seal carrier 190. The seal assembly 178 is received in a seal cavity 183. In the illustrated example, the seal cavity 183 is defined along the gap 185 by adjacent components 180A, 180B and the adjacent support structures 186A, 186B. The seal cavity 183 extends a distance between, or substantially between, ends 197A, 197B of the corresponding components 180A, 180B (FIG. 3B).

The housing 188 is coupled to at least one of the first and second support structures 186A, 186B. The support structures 186A, 186B can be coupled to, or are otherwise defined by, portions of the engine backbone or static structure 36 (FIG. 1). The housing 188 includes at least one support member 189, such as support members 189A, 189B extending away from the housing 188. The support members 189A, 189B are selectively received in corresponding slots 191A, 191B defined by the first and second support structures 186A, 186B. Each slot 191A, 191B is dimensioned to limit relative movement of the housing 188 and the support structures 186A, 186B. The slots 191A, 191B can be dimensioned relative to the support members 189A, 189B to permit a predefined amount of relative movement during thermal expansion or contraction, for example, such that the seal 192 is able to self-center in the seal cavity 183. In alternative examples, the housing 188 is fixedly attached to, or is integrally formed with, at least one of the first and second support structures 186A, 186B to limit relative movement.

The seal carrier 190 is moveable relative to the housing 188 in response to movement of at least one of the components 180A, 180B and/or support structures 186A, 186B in the radial R, axial X, and/or circumferential T directions. The seal carrier 190 is selectively biased from the housing 188 such that the seal 192 abuts against at least two distinct sealing surfaces 180 to provide a sealing relationship as discussed in detail below. The seal carrier 190 can be secured to housing 188 utilizing various techniques, such as one or more flanges, posts or fasteners, for example.

Figure 5:
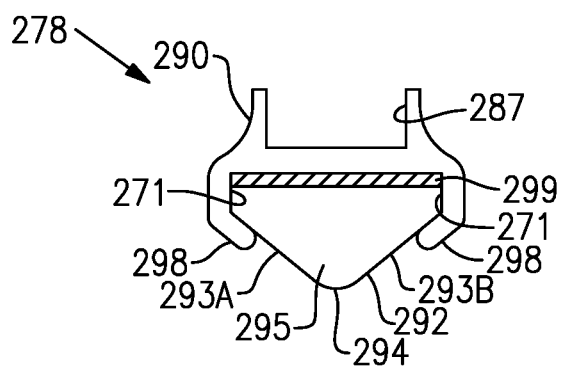
FIG. 5 illustrates a cross-sectional view of selected portions of a sealing arrangement according to a second example.

The seal carrier 190 defines a channel 179 configured to receive at least a portion of the seal 192. The seal 192 can be bonded, fastened or otherwise secured to the channel 179, for example. Ends 195 of the seal 192 extend outwardly from ends of the seal carrier 190 such that the ends 195 are positioned outside of the slot 191 (shown in FIG. 3B). Ends 195 of the seal 192 can be aligned or substantially aligned with end walls 197A, 197B of the corresponding components 180A, 180B. In another example, seal carrier 290 includes at least two retention members 298 extending inwardly from walls 271 of channel 279 to cradle or otherwise limit radial movement of seal 292 relative to the channel 279 as shown in FIG. 5. The retention members 298 can be dimensioned to permit the seal 292 to be slid or translated through the channel 279 between assembled and disassembled positions.

Figure 4:
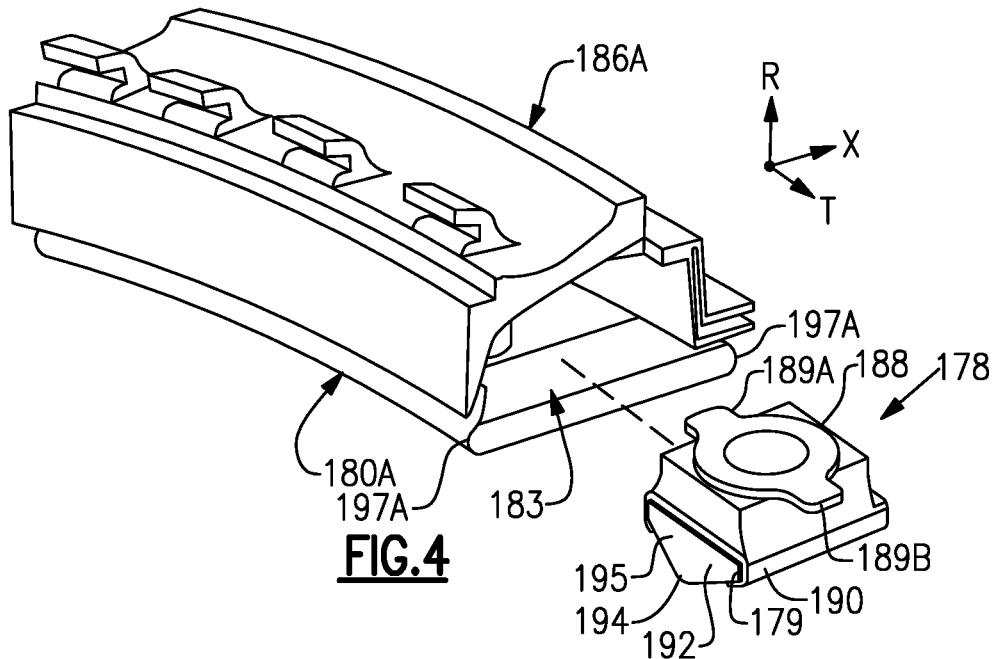
FIG. 4 illustrates an exploded view of selected portions of the sealing arrangement of FIGS. 3A and 3B.

In the illustrated example of FIGS. 3A-3B and 4, the seal assembly 178 includes a spring 181 or other spring means (e.g., thermally actuated material) received in a spring cavity 187. The seal carrier 190 and the housing 188 define portions of the spring cavity 187 such that the spring 181 is trapped or bound between the housing 188 and the seal carrier 190. The spring 181 is configured to selectively bias the seal carrier 190 away from the housing 188 in response to movement of at least one of the components 180A, 180B and/or support structures 186A, 186B. In the illustrated example, the spring 181 is a wave or coil spring. In alternative examples, the seal assembly 178 includes two or more springs located at different positions in the axial direction X to provide additional balancing of the seal 192. In other examples, spring 181 is two or more wave springs in stacked relationship, or is one or more leaf springs configured to permit the seal carrier 190 to rock or pivot relative to a reference plane extending in the axial and radial directions X, R.

The seal assembly 178 can be arranged such that the spring 181 is pre-loaded and secured in the spring cavity 187 and the seal 192 is secured in the channel 179 prior to installation of the seal assembly 178 in the seal cavity 183. This arrangement can improve the handling characteristics of the seal assembly 178, by reducing a likelihood of damage during handling, assembly or installation, for example, and can reduce installation time and complexity during installation of the seal assembly 178 in the seal cavity 183.

The seal 192 is configured to span across the gap 185 defined by the mate faces 184A, 184B. In the illustrated example, the seal 192 is an elongated wedge seal configured to extend substantially between ends 197A, 197B of the components 180A, 180B (FIG. 4). In some examples, the seal 192 is fabricated of a ceramic or ceramic composite including silicon nitride, a nickel-based superalloy, or the like. Materials of the seal 192 can be selected to have similar thermal characteristics as adjacent components 180A, 180B, such as ceramic BOAS.

The seal 192 is configured to abut against the first and second sealing surfaces 182A, 182B of the components 180A, 180B to provide a sealing relationship. The seal 192 defines a first engagement surface 193A and a second engagement surface 193B joined at an apex 194. The first engagement surface 193A is configured to abut against the first sealing surface 182A. The second engagement surface 193B is configured to abut against the second sealing surface 182B. Although the engagement surfaces 193A, 193B are depicted as being substantially two planar surfaces, in alternative examples, the engagement surfaces 193A, 193B may comprise convex surfaces, concave surfaces, multiple facets, or other geometry corresponding to the adjacent sealing surfaces 182A, 182B. The geometry of the engagement surfaces 193A, 193B can be selected to permit translation relative to the sealing surfaces 182A, 182B.

During installation of the seal assembly 178 in the seal cavity 183, the apex 194 is positioned in the gap 185 such that the first and second sealing surfaces 182A, 182B slope towards the corresponding first and second mate faces 184A, 184B. The arrangement of the sealing surfaces 182A, 182B relative to the engagement surfaces 193A, 193B improves self-centering of the seal 192 during transient operations of the engine 20. It should be appreciated that the apex 194 may be circumferentially offset relative to the gap 185 (see, e.g., FIG. 3C) during certain operating conditions. The geometry of the seal 192 improves the sealing characteristics of the seal assembly 178 and reduces the likelihood of damage caused by trapping portions of the seal 192 between the mate faces 184A, 184B during transient operations of the engine 20, for example.

The seal 192 is configured to self-center in response to movement of the seal carrier 190 relative to the housing 188, and can include pivoting and/or twisting of the seal 192 relative to the housing 188. Movement of the seal 192 relative to the housing 188 may occur, for example, in response to movement of the components 180A, 180B, support structures 186A, 186B and/or engine static structure 36 (FIG. 1). For the purposes of this disclosure, the term "self-center" means alignment of, or approaching alignment of, the engagement surfaces 193A, 193B relative to the orientation of sealing surfaces 182A, 182B in the radial, axial and/or circumferential directions.

One or more insulation members 199 (FIG. 3A) can be arranged at various locations at and/or between the seal 192 and the housing 188 to reduce thermal communication between the relatively hot core flow path C and other locations adjacent to the gap 185, such as cooling cavity 74 (FIG. 2). In the illustrated example, insulation members 199 are arranged between the seal carrier 190 and the seal 192, and between the seal carrier 190 and the spring 181. In one example, the insulation member 199 is a thermal barrier coating (TBC) deposited on surfaces of the seal 192, housing 188, seal carrier 190 and/or other surfaces of the seal assembly 178.

Figure 3C:
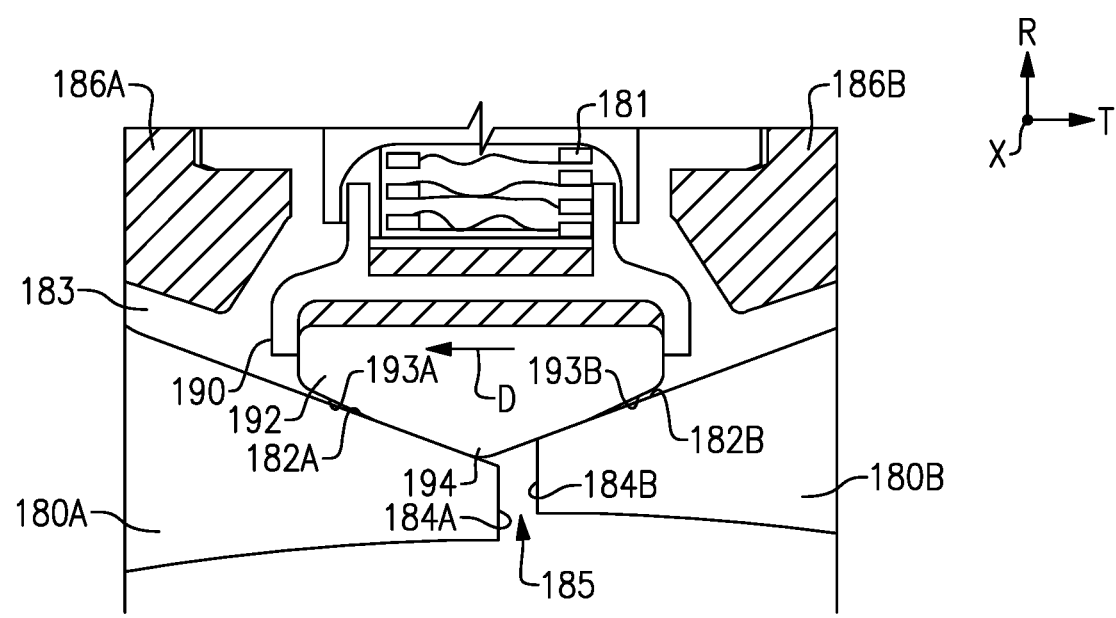
FIG. 3C illustrates a cross-sectional view of the sealing arrangement of FIG. 3A in a second position.

When in the installed position, the seal assembly 178 is situated in the seal cavity 183 adjacent to the gap 185 such that the seal 192 abuts sealing surfaces 182A, 182B of the adjacent components 180A, 180B. During operation of engine 20, the seal 192 moves relative to the sealing surfaces 182A, 182B in response to movement of at least one of the adjacent components 180A, 180B and/or support structures 186A, 186B. Movement of the seal 192 can include pivoting and/or twisting the seal 192 relative to the housing 188 such that the seal 192 self-centers relative to a change in position and/or orientation of the sealing surfaces 182A, 182B. Engagement surfaces 193A, 193B may translate relative to sealing surfaces 182A, 182B such that a sealing relationship is maintained, for example when the seal 192 moves in a direction D from a first position (FIG. 3A) to a second position (FIG. 3C). A spring constant of the spring 181 can be selected to bias the seal 192 towards the sealing surfaces 182A, 182B of the components 180A, 180B during cold assembly, and can be assisted by loading surfaces of the seal assembly 178 during operation of the engine 20. Loading can include pressurization of the cooling cavity 74 (FIG. 2) with cooling airflow during high power and/or high temperature conditions, for example.

Although particular step sequences are shown, described, and claimed, it should be understood that steps may be performed in any order, separated or combined unless otherwise indicated and will still benefit from the present disclosure.

It should be understood that relative positional terms such as "forward," "aft," "upper," "lower," "above," "below," and the like are with reference to the normal operational attitude of the vehicle and should not be considered otherwise limiting.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A seal assembly for a gas turbine engine comprising:
   a housing mountable to an engine static structure;
   a seal carrier secured to the housing and configured to be selectively biased from the housing;
   a wedge seal secured to the seal carrier, wherein the wedge seal abuts against sealing surfaces of adjacent blade outer air seals in response to movement of the seal carrier relative to the housing, and wherein the wedge seal is separate and distinct from the seal carrier;
   wherein the wedge seal spans across a gap defined by opposed mate faces of the adjacent blade outer air seals; and
   wherein the seal carrier defines a spring cavity receiving a spring that is configured to bias the seal carrier away from the housing.

2. The seal assembly as recited in claim 1, wherein the wedge seal defines a first engagement surface and a second engagement surface joined at an apex.

3. The seal assembly as recited in claim 1, wherein the wedge seal defines a first engagement surface and a second engagement surface joined at an apex that faces away from the housing.

4. The seal assembly as recited in claim 2, further comprising an insulation member arranged between the wedge seal and the housing.

5. The seal assembly as recited in claim 4, wherein the insulation member is a thermal barrier coating deposited on the wedge seal.

6. A seal assembly for a gas turbine engine comprising:
   a housing mountable to an engine static structure:
   a seal carrier secured to the housing and configured to be selectively biased from the housing;
   a wedge seal secured to the seal carrier, wherein the wedge seal abuts against sealing surfaces of adjacent blade outer air seals in response to movement of the seal carrier relative to the housing, and wherein the wedge seal is separate and distinct from the seal carrier; and
   an insulation member arranged between the wedge seal and the housing.

7. The seal assembly as recited in claim 6, wherein the insulation member is a thermal barrier coating deposited on surfaces of the wedge seal.

8. A gas turbine engine comprising:
   a section defining a core flow path along an engine axis;
   at least one set of components arranged about the engine axis to define a core flow path, the at least one set of components comprising:
      a first component defining a first sealing surface adjacent to a first mate face; and
      a second component defining a second sealing surface adjacent to a second mate face, the first and second mate faces spaced apart to define a gap; and
      a seal assembly comprising:
         a housing;
         a seal carrier secured to the housing and configured to be selectively biased from the housing; and
         a wedge seal secured to the seal carrier, wherein the wedge seal abuts against at least one of the first and second sealing surfaces and self-centers in response to movement of the seal carrier relative to the housing, and wherein the wedge seal is separate and distinct from the seal carrier;
   wherein the first component is mounded to a first support structure, the second component is mounted to a second, different support structure moveable relative to the first support structure, and the housing is coupled to at least one of the first and second support structures; and
   wherein the housing includes a support member selectively received in a slot defined by the first support structure.

9. The gas turbine engine as recited in claim 8, wherein the section is a turbine section, and each of the first and second components is a blade outer air seal (BOAS).

10. The gas turbine engine as recited in claim 9, wherein the wedge seal spans across the gap.

11. The gas turbine engine as recited in claim 10, wherein the wedge seal defines a first engagement surface and a second engagement surface joined at an apex, and the first engagement surface abuts against the first sealing surface and the second engagement surface abuts against the second sealing surface in response to movement of the seal carrier.

12. The gas turbine engine as recited in claim 11, wherein the apex is positioned in the gap, and the first and second sealing surfaces slope towards the corresponding first and second mate faces.

13. The gas turbine engine as recited in claim 10, wherein the seal assembly includes a spring configured to bias the seal carrier away from the housing in response to movement of the first component relative to the first support structure.

14. The gas turbine engine as recited in claim 10, wherein the seal carrier is moveable relative to the housing in response to movement of at least one of the first and second components in a circumferential direction relative to the engine axis.

15. The gas turbine engine as recited in claim 8, wherein the section is a turbine section.

16. The gas turbine engine as recited in claim 15, wherein each of the first and second components is one of an airfoil, a blade outer air seal (BOAS), and a combustor panel.

17. The gas turbine engine as recited in claim 8, wherein each of the first and second components is one of an airfoil, a blade outer air seal (BOAS), and a combustor panel.

18. The gas turbine engine as recited in claim 14, further comprising a spring that is configured to bias the seal carrier away from the housing.

19. The gas turbine engine as recited in claim 12, wherein the seal carrier defines a spring cavity receiving a spring that is configured to bias the seal carrier away from the housing.

20. The gas turbine engine as recited in claim 15, wherein the seal carrier defines a spring cavity receiving a spring that is configured to bias the seal carrier away from the housing.

* * * * *